March 18, 1930. C. C. FARMER 1,750,633
ELECTRIC TRAIN WIRE DEVICE
Filed March 1, 1928
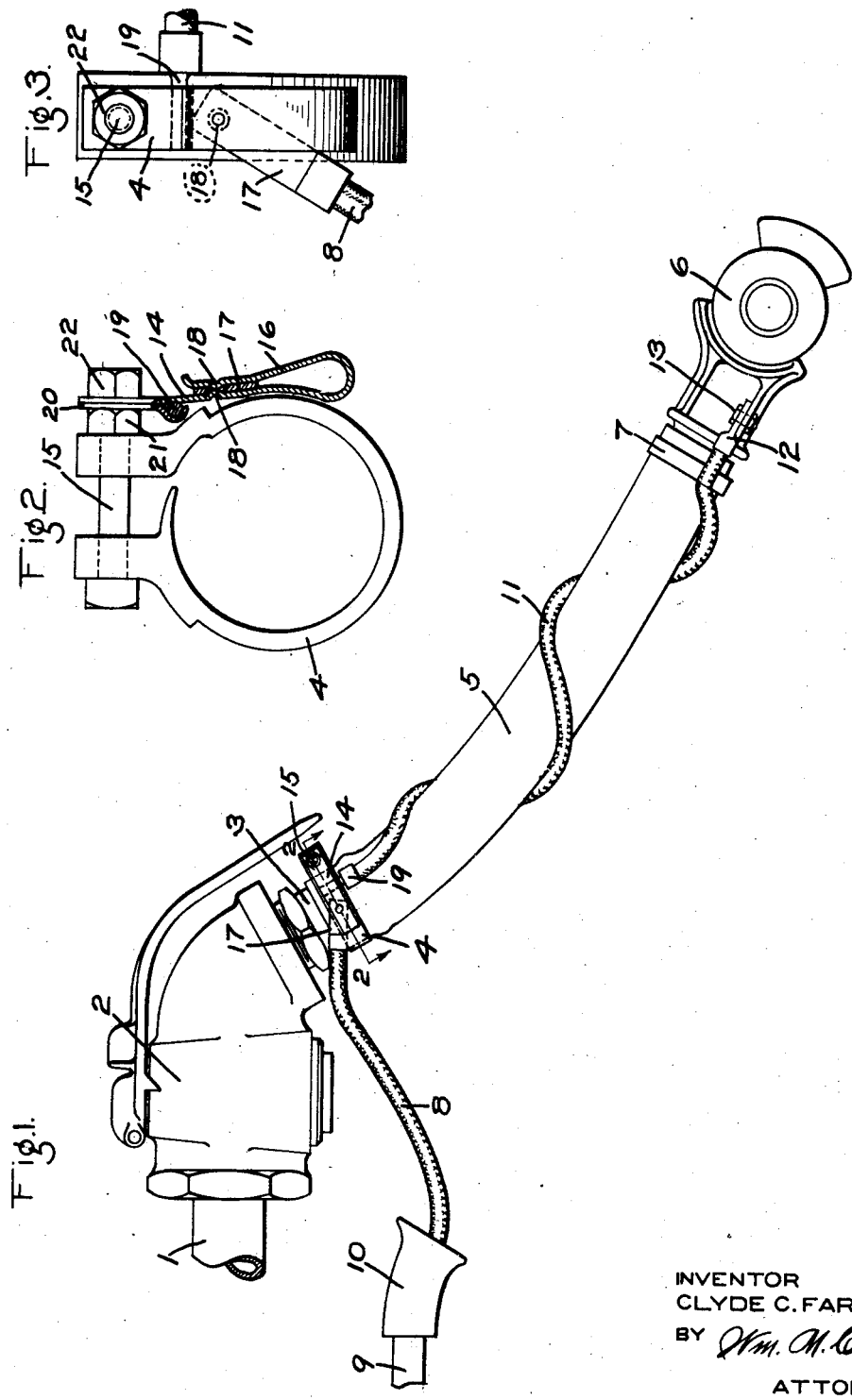
INVENTOR
CLYDE C. FARMER
BY *Wm. M. Cady*
ATTORNEY Patented Mar. 18, 1930

1,750,633

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTRIC TRAIN-WIRE DEVICE

Application filed March 1, 1928. Serial No. 258,238.

This invention relates to electric train wires and has for its principal object to provide improved means for electrically connecting the train wire of a car to the train wire of another car.

In the accompanying drawing; Fig. 1 is a view of a fluid pressure train pipe and a flexible hose, with means embodying my invention for electrically connecting a train wire between cars of a train; Fig. 2 a partial section on the line 2—2 of Fig. 1; and Fig. 3 an enlarged view of the flexible hose clamps, showing the electric train wire connection thereto.

In Fig 1, the reference numeral 1 indicates a fluid pressure train pipe, such as is commonly employed on railway cars for conducting fluid under pressure for controlling the brakes and the like. At each end of the car, the train pipe 1 is provided with an angle cock device 2 into which a hose nipple 3 is screwed, and clamped by a hose clamp 4 to said nipple, is a section of flexible hose 5. At the end of the flexible hose 5 a hand operated coupling head 6 is provided, the flexible hose being clamped to the nipple end of the coupling head by a hose clamp 7. The coupling head 6 is adapted to be coupled by hand to a counterpart coupling head of an adjacent car.

An electric train wire cable 8 extends from one end of the car to the other and may be encased in a pipe conduit 9 having a bell mouthed elbow 10 at each end.

A section 11 of cable is wound spirally around the flexible hose 5. The conducting wire of the cable 11 is provided at one end with a terminal clip 12 which is secured to a portion of the coupling head 6 by means of a bolt 13.

A spring clip 14 is provided having an opening at one end to receive the clamping bolt 15 of the hose clamp 4 and having the opposite end portion 16 bent to form a spring loop. The wire in cable 8 is provided with a terminal clip 17 having a hole adapted to receive detents 18 formed in the spring clip 14.

The inner end of the cable section 11 is provided with a preferably round terminal member 19 which is secured by clamping same between the spring clip 14 and a clamping plate 20.

The plate 20 and the spring clip 14 are clamped together, so as to securely hold the member 19, between the nuts 21 and 22 on the bolt 15.

The terminals of the cable section 11 are securely fastened to the coupling head 6 and to the hose clamp 4, so as to positively insure an electrical connection. If the flexible hose 5 should be pulled from the nipple 3, the clip terminal 17 will readily disengage from its position in the spring clip 14, so that the cable will not be damaged. When a new section of flexible hose is applied, the electrical connection is quickly effected by merely snapping the terminal member 17 into position in the spring clip 14.

The electric circuit is completed from one car to another when the hose coupling 6 of one car is coupled to the hose coupling of another car. The coupling head 6 is preferably made of brass to provide a better conductor.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a section of flexible hose and a hose coupling carried at one end of the hose section, of a cable section having one end electrically connected to said coupling, a member associated with the other end of the hose section to which the other end of said cable section is electrically connected, a train wire cable, and strain detachable means for connecting the terminal of said train wire cable to said member.

2. The combination with a section of flexible hose, a hose coupling head secured at one end of said hose section, a hose clamp at the other end of said section, a member carried by said hose clamp, a cable section having one terminal secured to said coupling head and the other terminal to said member, and a train wire cable having a terminal strain detachably connected to said member.

3. The combination with a section of flexible hose, a hose coupling head secured at one end of said hose section, a hose clamp at the other end of said section, a member carried by said hose clamp, a cable section wound spirally upon said hose section and having one terminal secured to said coupling head and the other terminal to said member, a train wire cable, and strain detachable means for connecting the terminal of said train wire cable to said member.

4. The combination with a section of flexible hose having a hose coupling at one end and a spring clip associated with the other end of said hose section, of a train wire cable having a terminal member strain detachably connected to said spring clip, and a cable section electrically connecting said spring clip with said coupling head.

5. The combination with a train pipe angle cock, a hose nipple carried by said angle cock, a flexible hose section, a hose clamp for securing one end of said hose section to said nipple, and a hose coupling head carried at the other end of said hose section, of a train wire cable having a terminal clip, a spring clip secured to said hose clamp and having strain detachable means for holding said terminal clip, and a cable section electrically connected at one end to said spring clip and at the other end to said coupling head.

In testimony whereof I have hereunto set my hand.

CLYDE C. FARMER.